Patented Dec. 12, 1922.

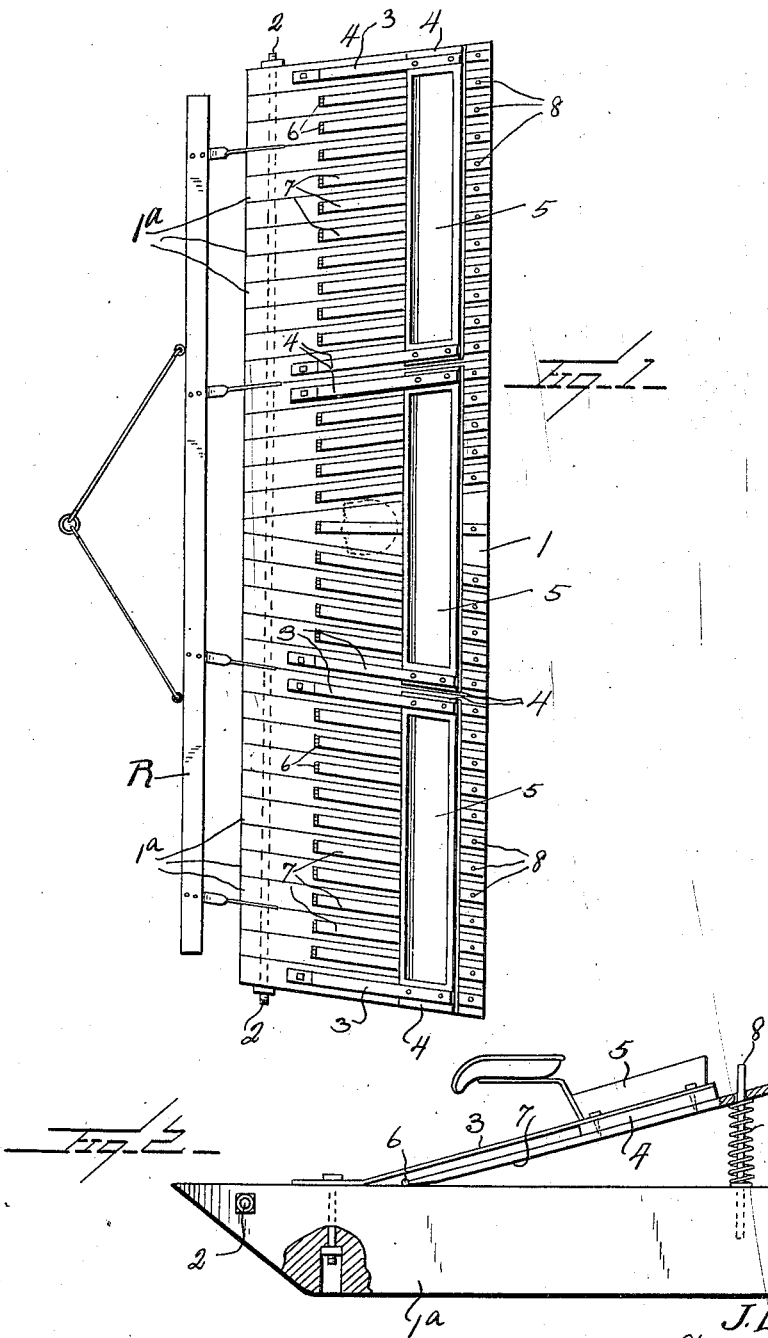

1,438,655

UNITED STATES PATENT OFFICE.

JOHN LINDEMAN AND WILLIAM HEDRICH, OF TROCHU, ALBERTA, CANADA.

DRAG.

Application filed October 3, 1921. Serial No. 506,537.

*To all whom it may concern:*

Be it known that we, JOHN LINDEMAN, a subject of the King of England, and WILLIAM HEDRICH, a citizen of the United States, residing at Trochu, in the Province of Alberta and Dominion of Canada, have invented certain new and useful Improvements in Drags, of which the following is a specification, reference being had to the accompanying drawings.

This invention relates to certain improvements in drags and it is an object of the invention to provide a novel and improved device of this general character especially designed and adapted for use in packing and levelling the soil.

An additional object of the invention is to provide a device of this general character embodying means of a novel and improved character whereby the drag operates to pack the soil smooth and tight without dragging the soil and which can be employed to advantage in packing the soil in hollows and which also operates effectively to break the land where there are thistles or stubbles.

Another object of the invention is to provide a novel and improved device of this general character which operates to treat the land in a manner whereby the possibility of drifting is substantially eliminated.

The invention consists in the details of construction and in the combination and arrangement of the several parts of our improved drag whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:

Figure 1 is a top plan view of a drag embodying the improvements of our invention, and Fig. 2 is a transverse sectional view thereof.

As disclosed in the accompanying drawings, our improved device comprises a central runner or slide 1 substantially V-shaped in form with its apex forwardly directed, and at each side of said central runner 1 in close proximity thereto and to each other are the outer runners $1^a$, the runners $1^a$ at opposite sides of the central runner 1 forwardly converging.

The forward end portions of the runners 1 and $1^a$ are connected by a bar or rod 2 which serves as a pivot or fulcrum common to all of the runners but permits each of the runners 1 and $1^a$ to have independent swinging movement in a vertical direction.

Suitably secured to the bar or rod 2 is a rigging R to which is adapted to be hitched a team of draft animals whereby the device may be readily drawn.

The end runners $1^a$ and intermediate pairs of adjacent runners $1^a$ each has secured to the top surface thereof adjacent its forward extremity, an end portion of a rearwardly and upwardly disposed strap or elongated member 3, preferably of iron, the upper or rear extremity of said strap or member being secured to an end portion of a beam 4 disposed lengthwise of the assembled device or in a direction substantially transverse to the direction of travel of the device.

As herein disclosed, the beams 4 are three in number and are maintained in suspension a desired distance above the runners 1 and $1^a$. Arranged upon each of the beams 4 is a box 5 of preferred dimensions and which is adapted to contain a weight of suitable material, such as stones, dirt or the like. This weighting of the beams 4 serves to materially increase the efficiency of the drag.

Hingedly connected, as at 6, with the upper face or surface of each of the runners 1 and $1^a$ at a point in advance of the adjacent beam 4 is an end portion of a rearwardly directed elongated strip or bar 7. This strip or bar 7 is of a length to terminate rearwardly of the adjacent beam 4 and the rear end portion of said bar or strip has loosely disposed therethrough an upstanding rod 8 carried by the rear portion of the coacting runner or slide 1 or $1^a$.

Interposed between said slide or runner 1 or $1^a$ and the strip or bar 7 is an expansible member 9, preferably a coiled spring encircling the rod 8. The member 9 serves to urge the runner or slide 1 or $1^a$ downwardly yet permitting the same to have yielding upward movement.

As the drag is drawn over the soil, each of the runners or slides 1 or $1^a$ is capable of independent swinging movement in a vertical direction which is of particular advantage in properly packing the soil in hollows. It has also been found in practice, that by having the runners or slides independently movable, a more effective packing of the soil is effected with a resultant levelling of the ground and which result is especially desired when a harvesting machine is adapted to be later used.

Our improved device has also been found to work with advantage in places where there are thistles or stubbles as it will break them up and also level the ground. Our improved device also effectively treats the soil to substantially eliminate drifting.

From the foregoing description it is thought to be obvious that a drag constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. An agricultural device of the class described comprising a plurality of runners, an intermediate runner being substantially in the form of a V, contiguous runners being closely adjacent to each other, runners at one side of the intermediate V-shaped runner converging toward the runners at the opposite sides of the intermediate V-shaped runner, and a rod pivotally connecting the runners at the forward end portions thereof.

2. An agricultural device of the class described comprising a plurality of runners, an intermediate runner being substantially in the form of a V, contiguous runners being closely adjacent to each other, runners at one side of the intermediate V-shaped runner converging toward the runners at the opposite sides of the intermediate V-shaped runner, and a rod pivotally connecting the runners at the forward end portions thereof, and means for urging the runners downwardly.

3. An agricultural device of the class described comprising a plurality of runners, an intermediate runner being substantially in the form of a V, contiguous runners being closely adjacent to each other, runners at one side of the intermediate V-shaped runner converging toward the runners at the opposite sides of the intermediate V-shaped runner, and a rod pivotally connecting the runners at the forward end portions thereof, the apex portion of the intermediate V-shaped runner being forwardly directed.

In testimony whereof we hereunto affix our signatures.

JOHN LINDEMAN.
WILLIAM HEDRICH.